April 30, 1957 W. L. HENDERSON 2,790,962
TERMINAL ASSEMBLY
Filed Oct. 15, 1953
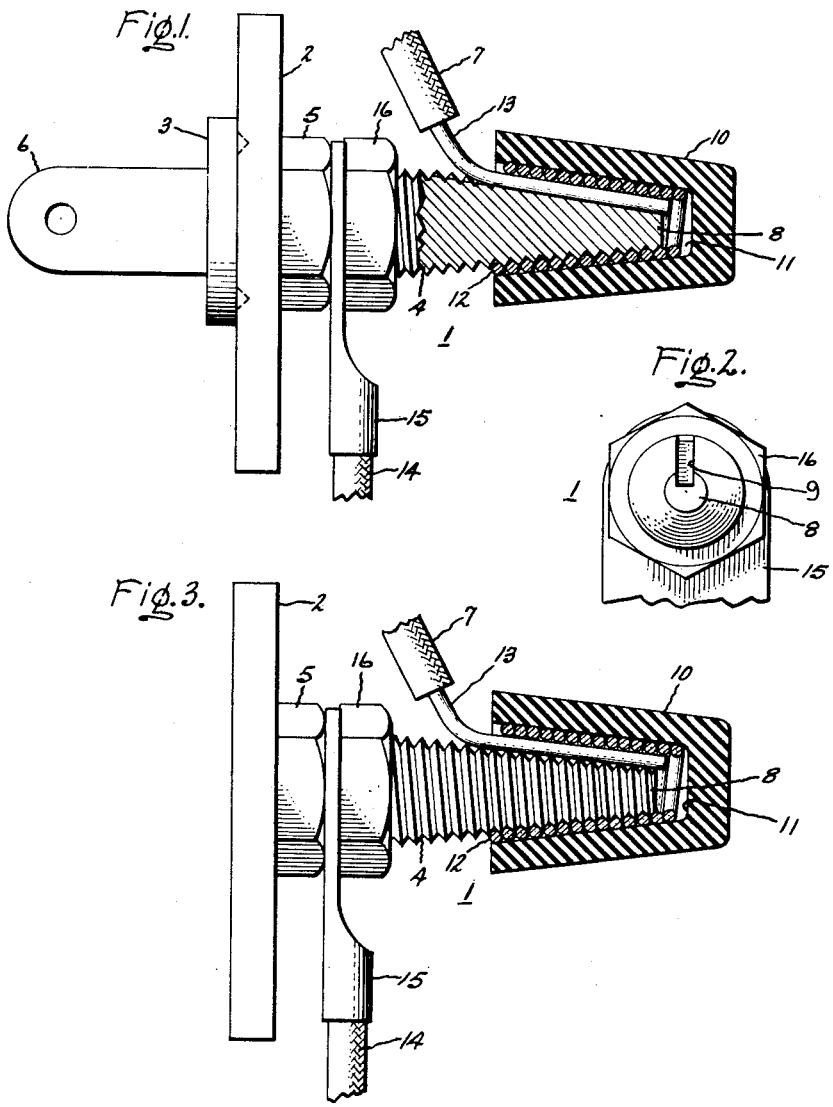
Inventor:
Wayne L. Henderson,
by Robert G. Irish
His Attorney.

2,790,962
TERMINAL ASSEMBLY

Wayne L. Henderson, Fort Wayne, Ind., assignor to General Electric Company, a corporation of New York Application October 15, 1953, Serial No. 386,256

2 Claims. (Cl. 339—202)

This invention relates to terminal assemblies and more particularly to a terminal assembly which permits quick attachment and detachment of a lead.

Terminal assemblies are utilized in many types of electrical apparatus in order to connect an external lead to the device. These assemblies ordinarily comprise a stud member secured to the device and permanently electrically connected thereto, and a fastening member for securing a lead to the external portion of the stud. In the past, it has ordinarily been necessary to bend the wire of the external lead at least partially around the external portion of the stud where it was secured in place by the fastening member. This required some time and effort to connect and disconnect the external lead and it is therefore desirable to provide a terminal assembly which does not require bending the wire around the stud and which permits quick attachment and detachment of the lead.

It is therefore an object of this invention to provide an improved terminal assembly incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of the specification.

In accordance with this invention, a terminal stud member is provided adapted to have its inner end secured to a mounting member and having its outer end tapered and threaded. A fastening member is provided adapted to be arranged over the tapered end of the stud member and having an inwardly tapered bore. The fastening member is provided with means in the bore for engaging the threads of the stud member so that a wire end may be inserted between the fastening member and the tapered end of the stud member and secured thereto by threading the fastening member on the stud member.

In the drawing, Fig. 1 is a side elevational view, partly in section, illustrating one form of the improved terminal assembly of this invention;

Fig. 2 is an end view of the terminal stud member of Fig. 1; and

Fig. 3 is a side elevational view, of another form of this invention.

Referring now to Figs. 1 and 2, there is shown a terminal stud member generally identified as 1 having its inner end secured to a mounting member such as an insulating terminal board 2 in any suitable manner. This may be accomplished by providing a head portion 3 on the inner end of stud member 1 and threading the stud member as at 4. Stud member 1 is therefore secured to terminal board 2 by engagement between head portion 3 and nut 5. An internal terminal 6 for permanent connection to the apparatus of which the terminal assembly is a part (not shown) may be formed integrally with head portion 3.

In order to provide for quickly attaching and detaching an external lead 7 from terminal stud 1, the outer end 8 is tapered and threaded as shown. A longitudinal slot 9 is preferably formed in the outer surface of tapered end 8 of stud member 1 with its bottom portion tapering inwardly with the respect to the outer surface in a direction toward the extremity of outer end 8. A fastening member 10, preferably formed of insulating material, is provided having an inwardly tapered bore 11. A coil spring 12 is positioned within bore 11 of terminal member 10 for engaging threads 4 of tapered end 8 of terminal stud member 1. It is thus seen that bared end 13 of external lead 7 may be positioned in slot 9 in tapered end 8 of terminal stud member 1 and fastening member 10 threaded there over thereby tightly securing lead 7 to the terminal stud member 1. This connection is readily effected by merely unscrewing the fastening member 10 from the stud member 1. Another lead 14 may be permanently secured to terminal stud member 1 by means of terminal 15 and nut 16 as shown.

Referring to Fig. 3 in which like elements are indicated by like reference numerals it will be seen that the end 8 of terminal stud member 1 may be provided with a slightly smaller diameter and the longitudinal slot 9 of Figs. 1 and 2 eliminated. Thus, the bare end 13 of external lead 7 is held in tight engagement with the tapered end 8 of terminal stud member 1 by engagement between the threads 4 and coil spring 12 of fastening member 10 which also engages threads 4.

It will now be readily apparent that this invention provides an improved terminal assembly wherein an external lead may be quickly attached to or detached from a stud member without the requirement for being wrapped around the terminal stud. It will also be readily apparent that integral internal threads may be formed in the bore of fastening member 10 thereby eliminating coil spring 12.

While I have shown and described particular embodiments of this invention, further modifications and improvements will occur to those skilled in the art. I desire it to be understood therefore that this invention is not limited to the form shown and I intend in the appended claims to cover all modifications which do not depart from the spirit and scope of this invention.

What I claim as new and desire to secure by Letters Patent of the United States is:

1. A terminal assembly comprising a terminal stud member adapted to have its inner end secured to a mounting member and having its outer end tapered and threaded, said tapered end of said stud member having a longitudinal slot formed in its outer surface for accommodating a wire end, said slot having its bottom portion tapering inwardly with the respect to said outer surface toward the extremity of said outer end, and a fastening member formed of insulating material and having an inwardly tapered bore for arrangement over said tapered end of said stud member, said fastening member having means in said bore for engaging said threads of said stud member whereby said wire end may be inserted in said slot and secured along a substantial portion of its length to said tapered end of said stud member by moving said fastening member onto said stud member and then threading said fastening member thereon.

2. A terminal assembly comprising a terminal stud member adapted to have its inner end secured to a mounting member and having its outer end tapered and threaded, said tapered end of said stud member having a longitudinal slot formed in its outer surface for accommodating a wire end, said slot having its bottom portion tapering inwardly with the respect to said outer surface toward the extremity of said outer end, and a fastening member formed of insulating material and having an inwardly tapered bore for arrangement over said tapered end of said stud member, said fastening member having a tapered coil spring in said bore for engaging said threads of said stud member whereby said wire end may be inserted in said slot and secured along a substantial portion of its length to said tapered end of said stud member by moving said fastening member onto said stud member and then threading said fastening member thereon.

References Cited in the file of this patent

UNITED STATES PATENTS

| | | |
|---|---|---|
| 242,388 | Smith | May 31, 1881 |
| 297,655 | Abernethy | Apr. 29, 1884 |
| 361,705 | Litchfield | Apr. 26, 1887 |
| 1,001,054 | Lawrence | Aug. 22, 1911 |
| 1,298,879 | Brown | Apr. 1, 1919 |
| 1,598,834 | Walker | Sept. 7, 1926 |
| 2,040,383 | Jasper | May 12, 1936 |
| 2,199,532 | Weeks | May 7, 1940 |

FOREIGN PATENTS

| | | |
|---|---|---|
| 178,337 | Switzerland | Jan. 2, 1936 |